(12) United States Patent
Espinasse et al.

(10) Patent No.: US 8,756,788 B2
(45) Date of Patent: Jun. 24, 2014

(54) METHOD FOR MANUFACTURING RIGID TUBULAR PIPES HAVING DOUBLE CASING, AND FACILITY DEDICATED TO MANUFACTURE OF SAID PIPES

(75) Inventors: Philippe Espinasse, Bihorel (FR); Jacques De Rumigny, Heaurteauville (FR)

(73) Assignee: Technip France (FR)

( * ) Notice: Subject to any disclaimer, the term of this patent is extended or adjusted under 35 U.S.C. 154(b) by 221 days.

(21) Appl. No.: 13/383,541

(22) PCT Filed: Jul. 8, 2010

(86) PCT No.: PCT/FR2010/051446
§ 371 (c)(1),
(2), (4) Date: Feb. 22, 2012

(87) PCT Pub. No.: WO2011/007083
PCT Pub. Date: Jan. 20, 2011

(65) Prior Publication Data
US 2012/0138183 A1   Jun. 7, 2012

(30) Foreign Application Priority Data
Jul. 17, 2009   (FR) ...................................... 09 03540

(51) Int. Cl.
*B21D 39/00* (2006.01)
*B21D 39/04* (2006.01)

(52) U.S. Cl.
USPC .......................................... 29/464; 29/455.1

(58) Field of Classification Search
CPC ........ B21D 39/04; B21D 39/06; B21D 39/00; B21D 39/046; B21D 53/06; B21D 53/08; B25B 27/10; F24H 1/101
USPC ...... 29/33 D, 234, 237, 282, 455.1, 464, 466, 29/890.036, 890.14; 138/33; 285/47, 285/123.1, 123.15, 123.2
See application file for complete search history.

(56) References Cited

U.S. PATENT DOCUMENTS 6,446,321 B1 *   9/2002   Marchal et al. ............... 29/455.1
6,564,011 B1 *   5/2003   Janoff et al. .................. 392/480
8,141,218 B2 *   3/2012   Van Zandwijk ................ 29/234

FOREIGN PATENT DOCUMENTS

GB          2084284 A       4/1982
WO     WO 97/36063 A1     10/1997

OTHER PUBLICATIONS

International Search Report dated Oct. 7, 2010, issued in corresponding international application No. PCT/FR2010/051446.
Spence M A et al: "Bi-Metal, CRA-Lined Pipe Employed for North Sea Field Development" Oil and Gas Journal, Pennwell, Houston, TX, US, vol. 97, No. 18, May 3, 1999, pp. 80-82,84, XP000833559 ISSN: 0030-1388 col. 1; figure 1.

* cited by examiner

*Primary Examiner* — Alexander P Taousakis
*Assistant Examiner* — Lee A Holly
(74) *Attorney, Agent, or Firm* — Ostrolenk Faber LLP

(57) ABSTRACT

A method and a facility for manufacturing rigid tubular pipes having a double casing for hydrocarbon transport. The pipes include an inner rigid tube (42, 242, 342, 442) that is inserted into an outer rigid tube (16, 216, 316, 416). The facility includes a supporting frame (12, 212, 312, 412) for an inlet end of the outer rigid tube and a movable apron (22, 222, 322, 422). The apron includes a catch (38, 238, 338, 438) for catching the rigid tube and inserting it in the outer rigid tube. The apron includes storage members (68, 268, 368, 468) for receiving stored heating cables (69, 269, 369, 469) and the driving force of the apron makes it possible to deploy a portion having the length of the stored heating cables (69, 269, 369, 469) so as to be able to apply the deployed portion, having the length of the heating cables, along the inner rigid tube (42, 242, 342, 442).

9 Claims, 3 Drawing Sheets

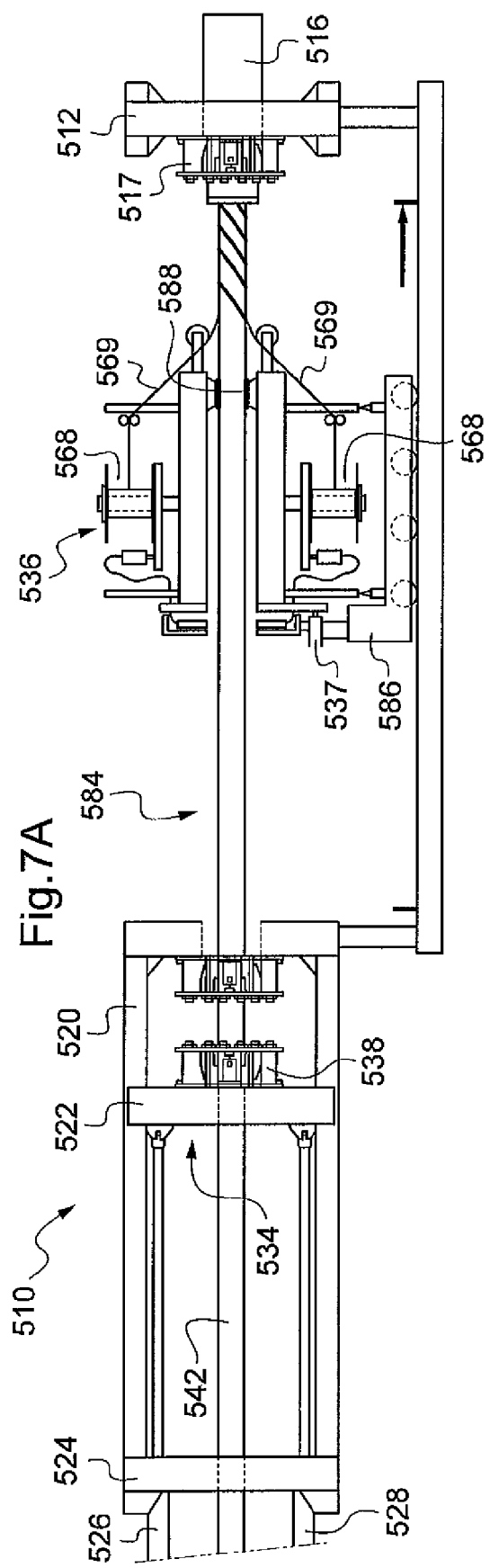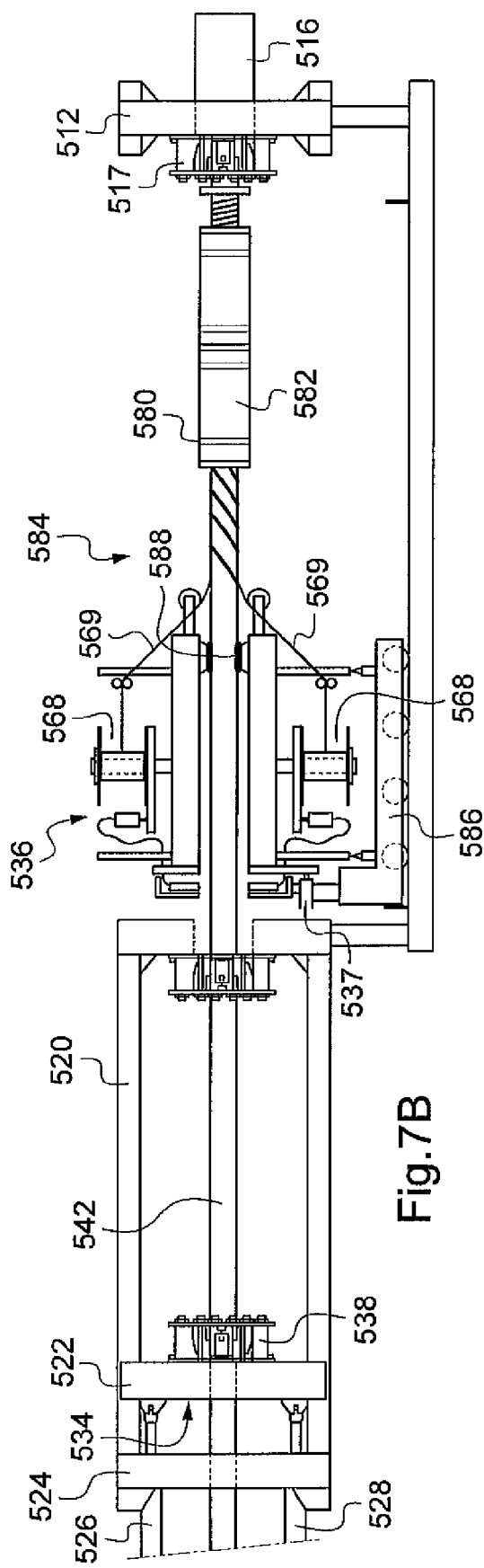

METHOD FOR MANUFACTURING RIGID TUBULAR PIPES HAVING DOUBLE CASING, AND FACILITY DEDICATED TO MANUFACTURE OF SAID PIPES

CROSS-REFERENCE TO RELATED APPLICATIONS

The present application is a 35 U.S.C. §§371 national phase conversion of PCT/FR2010/051446, filed Jul. 8, 2010, which claims priority of French Application No. 0903540, filed Jul. 17, 2009, the contents of which are incorporated by reference herein. The PCT International Application was published in the French language.

The present invention relates to a method for manufacturing rigid tubular pipes having a double casing and a facility dedicated to manufacture of said pipes. The invention also concerns the rigid tubular pipe having a double casing obtained by said method of manufacture.

These rigid tubular pipes, made up of two rigid tubes engaged one within the other, are intended for the transportation of hydrocarbons, notably on the seabed, and enable the hydrocarbons to be maintained at a given temperature in order that the paraffins that they contain do not set and block passage of hydrocarbons through the pipe. In fact, the hydrocarbon is initially at a relatively high temperature, when it is beneath the seabed, and is significantly cooled when it is conveyed in the pipes between the seabed and the surface. Insulating the double wall of the rigid pipe thus enables the hydrocarbon to be maintained at a temperature close to its original temperature. However, when hydrocarbon extraction is effected at a great depth, where the temperature at the level of the seabed is below 5° C., for example, the paraffins in particular set and form plugs that block the pipe. Under these conditions the insulated double casing is not sufficient by itself to prevent that occurrence with the paraffin.

To increase the temperature of the hydrocarbon flowing in the pipe, it has been envisaged to introduce additional thermal energy into it. Thus the document U.S. Pat. No. 6,564,011 discloses a rigid pipe including a rigid tube and a heating cable installed around the rigid tube, and the assembly being covered with a plastic material sheath. Such a device undoubtedly enables thermal energy to be supplied to the hydrocarbon flowing inside the rigid tube, but on the other hand is extremely costly because part of this thermal energy escapes to the exterior of the pipe via the plastic material sheath and is lost.

It has also been envisaged to cause an electrical current to flow between the two rigid tubes engaged one in the other of rigid tubular pipes having a double casing to heat the rigid tubes by the Joule effect. See in particular the document GB 2 084 284, which discloses one such device. However, this necessitates the provision on the one hand of an electrical insulator placed in the annular gap between the two rigid tubes to prevent the formation of electrical arcs and on the other hand of electrically conductive spacers to enable current to flow between the internal and external pipes. Furthermore, such a rigid tubular pipe consumes a great quantity of electrical energy.

SUMMARY OF THE INVENTION

Thus a problem that arises and that the present invention aims to solve is to provide a rigid tubular pipe that enables hydrocarbons to be conveyed on the seabed at great depth without plugs, in particular paraffin plugs, forming inside it, and that consumes little energy. The present invention also aims to provide a method of manufacture and an installation for using that method to manufacture a rigid tubular pipe adapted to convey hydrocarbons on the seabed at great depth.

With the aim of solving this problem, and in a first aspect, the present invention proposes a method of manufacturing rigid tubular pipes having a double casing for transporting hydrocarbons, said method being of the type in which there are provided an internal rigid tube and an external rigid tube adapted to be engaged one in the other, there is provided a frame for holding an inlet end of said external rigid tube, there is provided an apron equipped with activatable grasping means for grasping said rigid internal tube, said apron being mobile in translation between a position near said holding frame and a position far from said holding frame, said activatable grasping means are activated and said apron is driven toward said near position to engage said internal rigid tube in the interior of said external rigid tube leaving an annular space between the rigid tubes, and said activatable grasping means are then deactivated to release said internal rigid tube when said apron is driven in reverse toward said far position. According to the invention there are further provided heating cables for enabling a lengthwise heating cable portion to be applied along said internal rigid tube when said apron is driven in movement during the driving of said apron toward said near position and said lengthwise heating cable portion applied along said internal rigid tube is engaged in the interior of said annular space.

Thus one feature of the invention resides in the use of a heating cable inside the annular space between the two rigid tubes of the rigid pipe during its manufacture, without greatly modifying the existing installations for manufacturing pipes having a double casing, on the one hand, and without increasing the manufacturing time of those pipes. Thus this heating cable is installed virtually in masked time inside the annular space of the rigid pipe when the internal rigid tube is threaded into the interior of the external rigid tube. As explained in more detail hereinafter, the lengthwise heating cable portion is applied along said internal rigid tube either simultaneously when said apron is driven in movement or sequentially.

Until now, no simple and economical method has been developed for inserting a heating cable into the interior of the annular space of a rigid pipe having a double casing. Furthermore, the heating cable is advantageously applied to the internal tube and is covered with an insulative material before inserting the assembly into the interior of the external tube. Use of such a cable covered with thermal insulation enables significant reduction of the electrical energy consumption to power the heating cable and to provide the necessary thermal energy to the hydrocarbon conveyed in the pipe.

In one particular embodiment of the invention, said lengthwise heating cable portion is applied in a spiral around said internal rigid tube. Thus, on the one hand, the length of heating cable around the internal tube is increased and the transfer of heat to the hydrocarbon is more homogeneous, and, on the other hand, deterioration caused by elongation of the heating cable when the pipe is laid by the rigid paying out method is avoided.

Furthermore, a plurality of lengthwise heating cable portions are advantageously applied simultaneously, which enables the quantity of thermal energy that may be supplied to the hydrocarbon to be further increased.

Said heating cables are preferably bent and stored, and said lengthwise portion of stored heating cables is deployed to apply said deployed lengthwise heating cable portion along said internal rigid tube. Accordingly, as explained in more detail hereinafter, the bent and stored heating cables are easier to drive in movement around the internal rigid tube.

In one particular embodiment said bent heating cables are driven in rotation about said internal rigid tube to enable application of said lengthwise heating cable portion in a spiral. It will be noted that the plurality of lengthwise heating cable portions may also be deployed while turning them about the internal pipe in order to wind them substantially parallel to each other into a spiral.

According to a first variant of the invention, a lengthwise heating cable portion is applied along said internal rigid tube when said apron is driven in movement toward said near position. Thus the lengthwise heating cable portion is applied around the internal rigid tube as the latter is engaged in the interior of the external rigid tube.

According to a second variant, a lengthwise heating cable portion is applied along said internal rigid tube when said apron is driven in reverse toward said far position. Thus the heating cable is paid out and applied against the internal tube when the apron is driven in reverse to be able to seize the internal tube again and engage another length of internal tube in the interior of the external tube. As a result, the heating cable is applied while the apron is moving in reverse toward a loading position that is necessary to produce the rigid pipe. Furthermore, the spiral deployment may be effected simply, again while the apron is driven in reverse, i.e. in masked time.

Moreover, in this second variant, said bent heating cables are advantageously stored on said mobile apron, which greatly facilitates application of the lengthwise portion of heating cable. In fact, thanks to this feature, the installation for implementing the method of the invention is more compact. And what is more, if a plurality of lengthwise portions of heating cable is applied simultaneously, there is no risk of the lengthwise portions becoming entangled.

Again in the case of this second variant, but according to another embodiment described in more detail in the remainder of the description, the lengthwise heating cable portion is applied along the rigid tube independently of the apron moving in reverse toward said loading position. It may move in reverse simultaneously with, before or after applying the heating cable along the rigid tube.

Moreover, the internal rigid tube is advantageously clamped radially to grasp said internal rigid tube in such manner as to protect it from deformation and to preserve its integrity.

According to the second variant of the invention, and when the bent heating cables are stored to the rear of the apron, opposite the holding frame, said heating cables are preferably and advantageously guided relative to said apron when said apron is driven in reverse, in such manner as to facilitate their sliding relative to the apron and also to apply them directly to the internal pipe. Moreover, said stored lengthwise heating cable portion is deployed via said activatable grasping means when they are inactive and the apron is driven in reverse.

According to a second aspect, the present invention proposes an installation for manufacturing rigid tubular pipes having double casing for the transport of hydrocarbons, said tubular pipes comprising an internal rigid tube engaged in the interior of an external rigid tube, said installation comprising a frame for holding an inlet end of said external rigid tube and an apron mobile in translation between a position near said holding frame and a position far from said holding frame, said apron comprising means for grasping said rigid internal tube to enable grasping of said rigid internal tube and engagement of said internal rigid tube in the interior of said external rigid tube leaving an annular space between the two rigid tubes when said apron is driven toward said near position, said grasping means being adapted to release said internal rigid tube when said apron is driven in reverse toward said far position; according to the invention the installation further comprises storage members for storing stored heating cables and application means for enabling application of a lengthwise portion of stored heating cables along said internal rigid tube when said apron is driven in movement, and during the driving of said apron toward said near position said lengthwise heating cable portion applied along said internal rigid tube is engaged in the interior of said annular space.

Accordingly, the pipe manufacturing installation is itself relatively simple to implement starting from a conventional installation for manufacturing pipes having a double casing. The stored lengthwise heating cable portion is applied along the internal rigid tube and the apron is driven in movement either simultaneously or sequentially.

Said storage members of said stored heating cables are advantageously mounted on said application means, which enables the installation to be erected in a relatively restricted space, as explained hereinafter.

In a first embodiment of the installation, said application means are mounted around said internal rigid tube and at a particular distance from said holding frame. As a result, the application means are mounted in a fixed position relative to the holding frame in a direction parallel to the internal rigid tube, while the apron is mobile in translation relative to the application means. Thus this first embodiment of the installation enables use of the method of the invention in accordance with the aforementioned first variant.

In a second embodiment of the installation, said application means are mounted on said apron and are therefore mobile in translation with the apron relative to the holding frame. This second embodiment enables the method of the invention to be used in accordance with the second variant specified hereinabove and described in more detail hereinafter.

Thus if the heating cable storage members are also mounted on the apron, the pipe manufacturing installation is relatively simple and based on a standard installation for manufacturing pipe having a double casing. Consequently, the additional cost of manufacturing these rigid tubular pipes is substantially equivalent to the cost of the heating cable.

Said grasping means are advantageously fastened to said application means, which are themselves fastened to the apron. Moreover, in one particular embodiment of the invention, said application means comprise a drum mounted to rotate about an axis substantially coinciding with said internal rigid tube. Thus, when said storage members of said heating cables are mounted on the drum, the latter drum enables them to be driven around the internal rigid tube whilst allowing deployment of a lengthwise portion of heating cables.

As a result, in the second embodiment of the installation, the drum may be driven in rotation when the apron is driven in reverse and thus enable winding of the lengthwise portion of heating cable in a spiral around the internal rigid tube. Thus the heating cable is wound in a spiral in a simple manner, with a lay that may be adjusted by adjusting the relative speeds of rotation of the drum and of reverse movement in translation of the apron. From these are defined the helix angle, which must be in the range 10 to 30°, for example 15°.

It will be noted that a drum equipped with storage members for the heating cable may advantageously also be installed between the holding frame and the apron, as in the first embodiment of the invention. Moreover, in this particular embodiment, the installation for manufacturing rigid tubular pipes further comprises a carriage mobile in translation between said apron and said holding frame and said application means are mounted on said mobile carriage. As a result, the heating cables are applied along the internal rigid tube by means of the mobile carriage that is driven in translation between a position near the holding frame and a position far from it. The apron situated upstream of the mobile carriage is driven in translation independently of the latter carriage, either simultaneously or sequentially.

Moreover, said storage members advantageously comprise a plurality of spools mounted to rotate about their respective axis on said application means in such manner as to enable simultaneous application in spirals of a plurality of lengthwise heating cable portions. As a result, the spools on which the heating cables are wound enable the cables to be paid out as the apron is driven in translation, because the heating cables already paid out are trapped between the two rigid tubes. Thus there is no need to provide any particular driving of these spools.

Moreover, according to another advantageous feature, said grasping means comprise activatable jaws adapted to clamp the internal rigid tube radially to grasp said internal rigid tube.

The mode of operation of these activatable jaws is explained in more detail hereinafter.

In a particularly advantageous manner, said activatable jaws are installed on said drum in such manner as to enable adjustment and guidance of the heating cable between the activatable jaws without damaging it when the apron is driven in reverse.

According to a further advantageous embodiment of the invention, said apron includes a central passage to allow the free passage in translation of said rigid internal tube, and in the event of use of the second variant, also to allow the passage of said deployed lengthwise heating cable portion. Accordingly, the apron may be driven in translation without interfering with the internal pipe or the heating cables. What is more, the apron advantageously being constituted of a thick rectangular plate installed substantially perpendicularly to the pipe, it is easy to provide at least two hydraulic actuators for driving this apron on either side of the central passage. As a result, the activatable jaws are installed facing the central passage and the thrust produced by the two hydraulic actuators is applied directly to the internal tube so as to be able to force it inside the external tube as explained in more detail hereinafter.

Said apron preferably comprises guide means for guiding said deployed lengthwise heating cable portion in translation through said apron in such manner as on the one hand not to damage the heating cables and on the other hand to be able to apply them precisely against the internal tube.

According to a further aspect, the present invention concerns a rigid tubular pipe obtained by the aforementioned method.

BRIEF DESCRIPTION OF THE DRAWINGS

Other features and advantages of the invention emerge on reading the description given hereinafter of one particular embodiment of the invention, provided by way of nonlimiting illustration, given with reference to the appended drawings, in which:

FIGS. 7A and 7B are diagrammatic detail views in axial section of an installation conforming to a fifth embodiment of the invention for manufacturing rigid tubular pipes.

DESCRIPTION OF PREFERRED EMBODIMENTS

Figure 2:
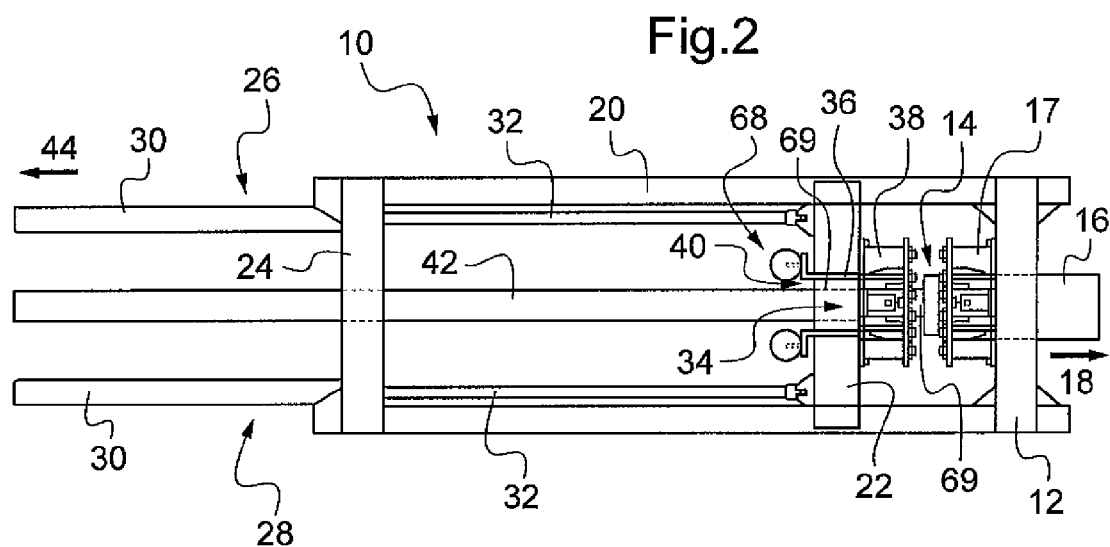
FIG. 2 is a diagrammatic view in axial section of the installation conforming to the first embodiment of the invention in a first working position.

First elements of the installation 10 of the invention for manufacturing rigid tubular pipes are described first with reference to FIG. 2. The installation 10 includes a holding frame 12 adapted to hold the inlet end 14 of an external rigid tube 16 in a fixed position. The holding frame 12 includes a thick plate and first clamping means 17 for clamping the external rigid tube 16, as described in detail hereinafter. The external rigid tube 16 extends longitudinally on the downstream side 18 of the holding frame 12, while on the opposite side extends longitudinally a chassis 20 inside which is a sliding apron 22 adapted to be driven. The chassis 20 includes a stop plate 24 opposite the holding frame 12 at a distance in the range 5 to 20 m, for example. The stop plate 24 and the apron 22 are connected by two peripheral actuators 26, 28, the body 30 of these peripheral actuators being fastened to the stop plate 24, while the end of their rod 32 is fastened to the apron 22. The latter apron includes a central passage 34, a drum 36 installed through the central passage 34, and the second clamping means 38 mounted on the drum 36 facing the holding frame 12. Furthermore, the drum 36 also includes a central space 40 enabling the passage of a rigid internal tube 42 adapted to extend longitudinally inside the chassis and also to pass freely through the stop plate 24.

On the downstream side 18 and the upstream side 44, the external rigid tube 16 and the internal rigid tube 42, respectively, are produced by assembling tube sections. Obviously, the diameter of the external rigid tube 16 is greater than that of the internal rigid tube 42 so that it is possible to engage the latter in the former. Thus the second clamping means 38 enable clamping of the internal rigid tube 42, which is then fastened to the apron 22, and the latter apron is adapted to be driven in translation toward the holding frame 12 by means of the peripheral actuators 26, 28 to force the internal rigid tube 42 longitudinally into the interior of the external rigid tube 16.

Figure 1:
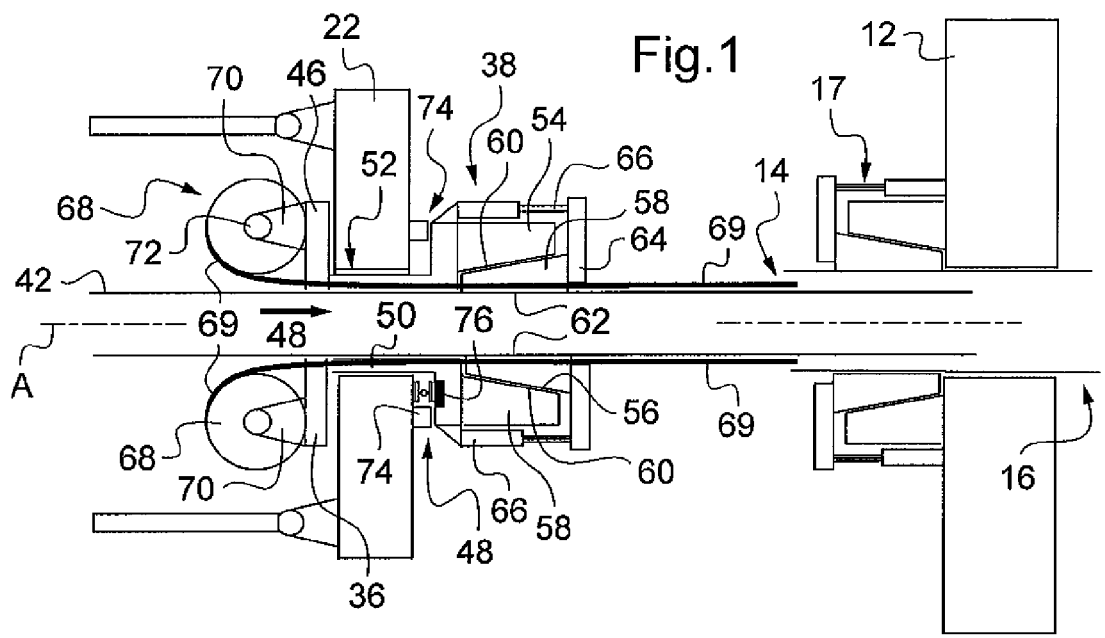
FIG. 1 is a detailed diagrammatic view in axial section of an installation conforming to a first embodiment of the invention for manufacturing rigid tubular pipes.

The installation conforming to the invention is described in more detail next with reference to figure 1. FIG. 1 includes the frame 12 equipped with its first clamping means 17 and the apron 22 provided with its drum 36 and its second clamping means 38 fastened to the drum 36. The inlet end 14 of the external rigid tube 16 is held in a fixed position clamped by the first clamping means 17, while the internal rigid tube 42 is held clamped by the second clamping means 38.

The drum 36 includes two opposite flanges 46, 48 connected together by a ring 50 mounted through the central passage 34 to rotate freely by means of a bearing 52. The ring 50 extends through the apron 22 and the flange 48 situated outside the apron faces the frame 12, while the other flange 36 faces the frame 12, also outside the apron 22. Accordingly, the drum 36 is free to rotate about a longitudinal axis A substantially corresponding to the axis of the internal rigid tube 42 and that is substantially perpendicular to the apron 22. However, on the one hand means for locking the drum 36 in rotation relative to the apron 22 are provided but are not shown here and on the other hand rotation drive means are also provided, for example an electric motor that is not shown. The second clamping means 38 are installed precisely on the flange 48 facing the frame 12. These second clamping means 38 comprise a first frustoconical ring 54 centered on the ring 50 which includes a frustoconical internal wall 56 open toward the holding frame 12. To the interior of this frustoconical ring 54 are applied jaws 58 having an inclined wall 60 adapted to come to bear against the frustoconical internal wall 56. The jaws 58 have opposite their inclined wall a clamping wall 62 adapted to come to be engaged against the internal tube 22. The jaws 58 are retained by a drive disk 64 installed coaxially in front of the first frustoconical ring 54 and is connected to the latter ring by hydraulic coupling actuators 66. Accordingly, when the coupling actuators 66 are retracted in an axial direction, the drive disk 64 drives the jaws 58 axially toward the interior of the first frustoconical ring 54 so that their inclined wall 60 comes to slide against the frustoconical internal wall 56 of the first ring 54 which then forms a ramp and thus causes radial movement toward each other of the clamping walls 62 and, as a consequence of this, clamping of the internal rigid tube 42.

On the opposite side, the other flange 46 is equipped here with two diametrically opposite spools 68 onto which heating cables are wound. Storing cables by winding them around a spool is an extremely practical way of bending them so as to be able to deploy them afterwards. These two spools 68 are installed eccentrically on the other flange 46 by means of a yoke the rotation shaft 72 of which is substantially perpendicular to the longitudinal axis A. The spools 68 are free to rotate about their shaft 72. On the other hand, means not shown enable them to be locked against rotation. The heating cables 69 are adapted to extend through the opposite flanges 46, 48 and through the ring 50 and the apron 22 inside the central passage 34 around the internal rigid tube 42. They are also adapted to extend through the first frustoconical ring 54 and between the jaws 58. To prevent them from being damaged, roller type guide means, not shown, are provided on the drum 36 along the path of the heating cables 69. The drum 36 then constitutes means for application of the heating cables 69 around the internal rigid tube 42, while the spools 68 constitute means for storing the heating cables 69.

Moreover, the apron 22 is provided with a bearing abutment 74 to the rear of the flange 48 facing the frame 12, to retain the drum 36 axially when the apron is driven in axial translation toward the holding frame 12. Moreover, spring means 76 enable damping of the bearing of the flange 48 against the bearing abutments 74. In fact, the forces that are exerted on the drum 36 when the internal rigid tube 42 is forced into the external rigid tube 16 are relatively high and lead to slight axial relative movement of the drum 36 relative to the apron 22 that the bearing 52 is not able to absorb on its own.

On the opposite side, the first clamping means 17 are constituted of elements analogous to the second clamping means 38 and are activated from the outset and deactivated only when the rigid tubular pipe is finished.

Thus the structural elements have been defined, so consider now FIG. 2, showing the starting point of the method of installing the heating cables 69 around the rigid internal tube 42. Thus, in this position, the first clamping means 17 are activated while the second clamping means 38 are placed in a deactivated position, i.e. the hydraulic coupling actuators 66 shown in FIG. 1 are brought into an extended position and the clamping wall 62 of the jaws 58 is moved away from the internal rigid tube 42 in order to release it. Moreover, the heating cables engaged in the annular gap between the external rigid tube 16 and the internal rigid tube 42 extend through second clamping means 38 and through the drum 36 and the apron 22 to return to the spools 68. Moreover, the means for locking the drum 36 against rotation are deactivated so that the latter drum may be driven in rotation.

The peripheral actuators 26, 28 are then commanded to retract them to drive the apron 22 in translation in a direction away from the holding frame 12 and the drum 36 is simultaneously driven in rotation, while the spools 68 on which the heating cables are wound are free to rotate. Consequently, the double movement in rotation and translation enables two particular lengths of the two diametrically opposite heating cables 69 to be deployed and applied in a spiral around the internal rigid tube 42. The movement in rotation of the drum 36 is then stopped as soon as the apron 22 is at a given distance from the stop plate 24.

Figure 3:
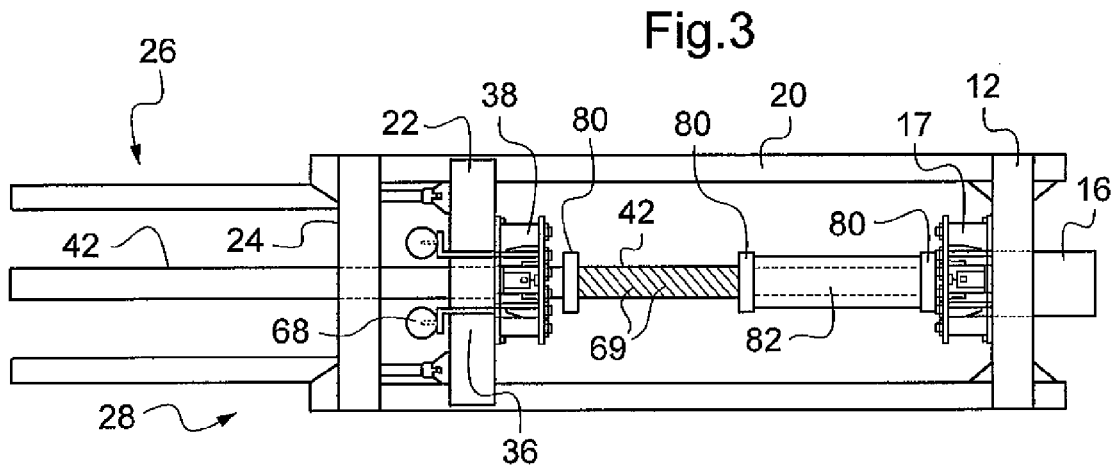
FIG. 3 is a diagrammatic view in axial section of the installation shown in FIG. 2 in a second working position.

Refer now to FIG. 3 in which the apron 22 is stopped and is situated at said given distance from the stop plate 24, facing the holding frame 12. This figure shows heating cables 69 wound around the internal rigid tube 42.

Moreover, in this position spacers 80 are installed around the internal rigid tube 42, holding the heating cables 69 so that they bear against the external surface of the rigid internal tube 42 and the latter is covered with insulation 82 that extends in cylindrical manner around the internal rigid tube 42 and axially between the spacers 80. Then, and conversely, the means for locking the drum 36 against rotation and the second means 38 for clamping the internal rigid tube 42 are activated. Then the peripheral actuators 26, 28 are caused to extend in such manner as to drive the apron 22 in translation toward the holding frame 12. As a result, a given length of the rigid internal tube 42 equipped with two particular lengths of heating cables 69, the spacers 80 and the insulation 82 are forced into the interior of the external rigid tube 16. This given length of the rigid internal tube 42 corresponds to the stroke of the apron 22 between the stop plate 24 and the holding frame 12.

As a result, the heating cables 69 are applied around the internal rigid tube 42 in masked time, which enables production of rigid tubular pipes having a double casing equipped with heating cables at a relatively low cost, since the manufacturing time is not affected compared to conventional installations.

The invention also concerns a rigid tubular pipe having a double casing obtained by the method described above. These pipes having a double casing are laid by the so-called rigid paying out method. Thus to avoid damaging the heating cable by stretching caused by flexing of the pipe when it is wound onto the shipboard storage spools, there is provision for an increase in the length of the cable. The use of helical heating cables in the aforementioned method is then particularly advantageous.

Nevertheless, if an elastically deformable cable is used, it is no longer necessary to add an additional length of heating cable, in particular if the pipe is installed using the rigid paying out method, and laying the cable parallel to the internal rigid tube may then be envisaged. To do this the drum is locked against rotation.

There is provision for equipping the rigid tubular pipe having a double casing produced in this way with a three-phase electrical power supply. At least one multiple of three cables is laid that may be carried by a single spool. The storage capacity of the spool depends on the available space. It is then necessary to provide for reloading the spools splicing the cables by welding to ensure continuity.

Figure 4:
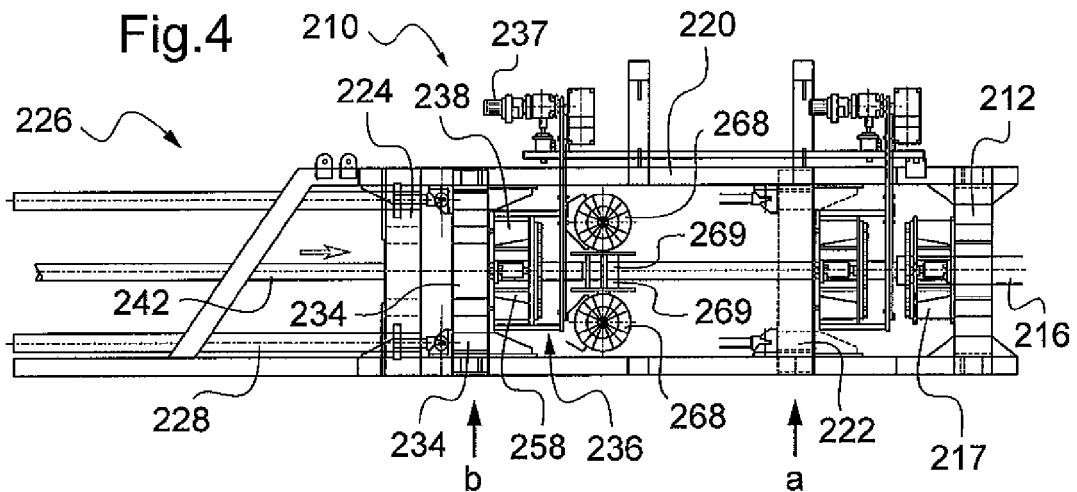
FIG. 4 is a diagrammatic detail view in axial section of an installation conforming to a second embodiment of the invention for manufacturing rigid tubular pipes.

A second embodiment of the invention is described with reference to FIG. 4. Elements common to the previous embodiment have the same reference preceded by the digit "2" for second. Thus FIG. 4 shows a second installation 210 including a second holding frame 212 for holding a second external rigid tube 216. The latter has second first clamping means 217. Second chassis 220 comprises a second apron 222 shown in its two extreme positions, one position a near the second holding frame 212, the other position b far from the latter. The second chassis 220 has a second stop plate 224 and the second apron 222 is connected thereto by way of two second peripheral actuators 226, 228. The second apron 222 has a second central passage 234 to enable passage of a second internal rigid tube 242 and a second drum 236 installed not through the central passage 234 but on the face of the second apron 222 facing the second holding frame 212. Second second clamping means 238 are also installed on the second apron 222. The second drum 236 is then equipped with four second spools 268 of heating cables diametrically opposite in pairs and arranged around the second internal rigid tube 242. The second drum 236 is adapted to be driven in rotation by an electric motor 237 connected to a variable speed drive. These driving elements are obviously fastened to the second apron 222 in such manner that they may be driven in translation with it.

The mode of operation of the second installation 210 is then analogous to the preceding one. On the other hand, a second chassis 220 is provided that is significantly longer to attain a stroke of the second apron 222 of approximately 4.50 m without being impeded by the second spools 268.

Figure 5:
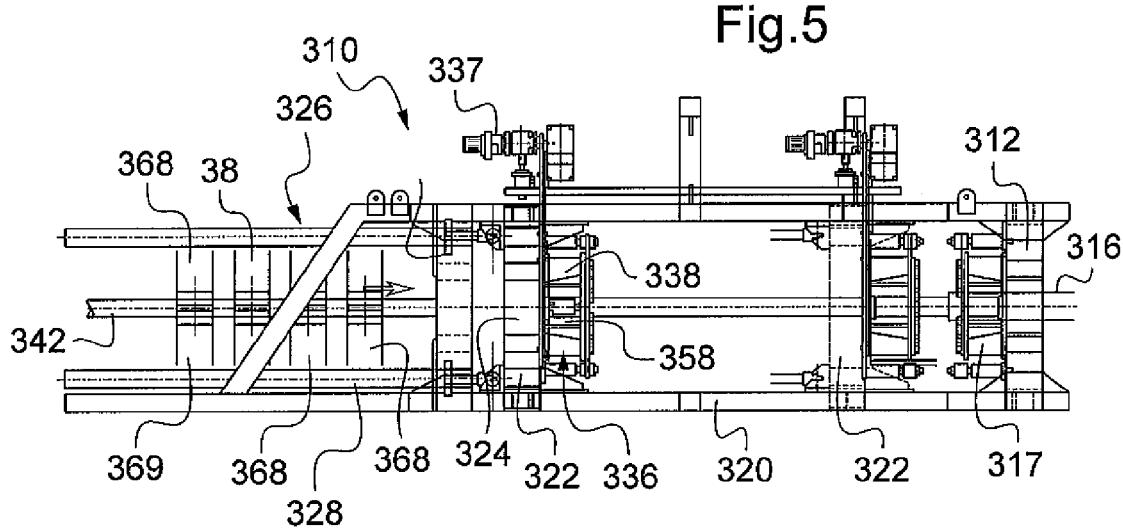
FIG. 5 is a diagrammatic detail view in axial section of an installation conforming to a third embodiment of the invention for manufacturing rigid tubular pipes.

Refer now to FIG. 5 showing a third embodiment of the invention in which the references of common elements are preceded by the digit "3" for third. Thus a third installation 310 comprises a third holding frame 312 for holding a third external rigid tube 316 and includes third first clamping means 317. A third chassis 320 comprises a third apron 322 shown in its two extreme positions. The third chassis 320 includes a third stop plate 324 and the third apron 322 is connected thereto by way of two third peripheral actuators 326, 328. The third apron 322 has a third central passage 334 to allow the passage of a third internal rigid tube 342 and a third drum 336 installed on the face of the third apron 322 facing the third holding frame 312. The third drum 336 is adapted to be driven in rotation by a third electric motor 337. Third second clamping means 338 are also installed on the third drum 336. On the other hand, the third installation 310 is equipped with four third spools 368, successively installed around the internal rigid tube 342 in such manner that the latter tube extends along their rotation axis. Thus the third internal rigid tube 342 is threaded through each of these third spools 368. Each of the third spools 368 is then equipped with a rotary arm, not shown, that picks up the heating cable to feed it along the internal rigid tube 342. The four arms are oriented at 90° to each other and are constrained to rotate together. The heating cables then pass through the third jaws 358 installed on the third drum 336.

Obviously, in the second and third embodiments described above, the electric motor coupled to the reducer is also equipped with a clutch and brake system. The speed of the reducer is also variable. Thus the driving in rotation of the drums 236, 336 may be rendered independent of the movement in translation of the aprons 222, 322. However, depending on the mode of operation, the movement of the apron then causes the drum to rotate.

Figure 6:
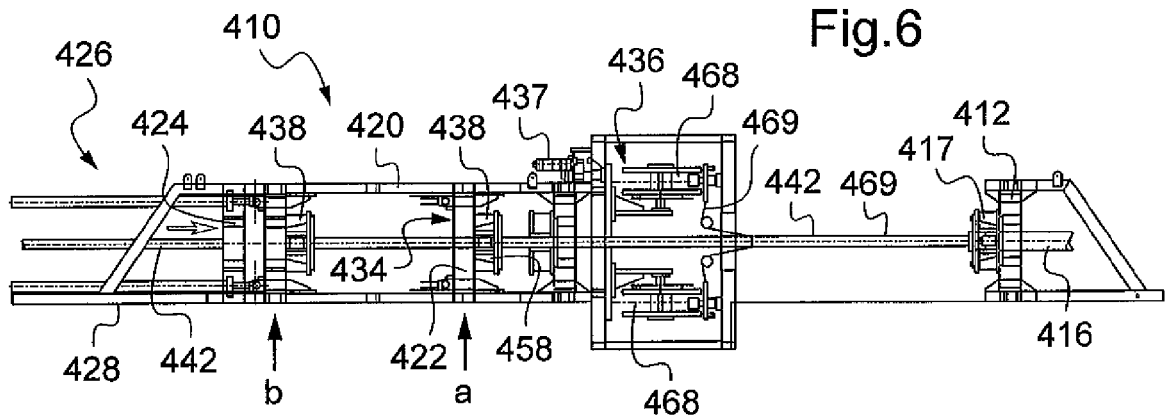
FIG. 6 is a diagrammatic detail view in axial section of an installation conforming to a fourth embodiment of the invention for manufacturing rigid tubular pipes.

A fourth embodiment of the invention is described next with reference to FIG. 6. On the principle adopted above, the references of elements common to the previous embodiments are preceded by the digit "4" for fourth.

A fourth installation 410 comprises a fourth holding frame 412 for holding a fourth external rigid tube 416 and includes fourth first clamping means 417. A fourth chassis 420 comprises a fourth apron 422 also shown here in its two extreme positions a, b. The fourth chassis 420 includes a fourth stop plate 424 and the fourth apron 422 is connected thereto by way of two fourth peripheral actuators 426, 428. The fourth apron 422 includes a fourth central passage 434 to allow the passage of a fourth internal rigid tube 422. On the other hand, fourth clamping means 338 are installed on the face of the fourth apron 422 facing the fourth holding frame 412 around the fourth central passage 434 and in fixed manner relative to the apron 422. Moreover, a fourth drum 436 is installed, no longer fastened to the apron 422, but in a fixed position relative to the fourth holding frame 412 and in a direction parallel to the axis of the fourth internal rigid tube 442, and also between the fourth apron 422 and the fourth holding frame 412. The fourth drum 436 is then equipped with four fourth spools 468 of heating cables 469 diametrically opposite in pairs and arranged around the fourth internal rigid tube 442. Only two of these four spools 468 are shown here. The fourth drum 436 is intended to be driven in rotation by a fourth electric motor 437 also coupled to an adjustable variable speed drive.

Accordingly, in this fourth embodiment of the invention, lengthwise heating cable portions 469 are applied along the fourth internal rigid tube 442, not now when the fourth apron 422 is driven in reverse toward a position b away from the holding frame 412 but, to the contrary, when it is driven in translation toward the near position a of the holding frame 412. Consequently, the fourth drum 436 is commanded to rotate when a fourth apron 422 is driven toward the holding frame 412 in such manner as simultaneously to apply the four heating cable 469 portions in a spiral around the internal rigid tube 442. The internal rigid tube 442 equipped with the heating cables 469 is then forced into the interior of the external rigid tube 416.

A fifth embodiment of the invention is described next with reference to FIGS. 7A and 7B. Again the references of the elements common to the previous embodiments are preceded by the digit "5" for fifth.

A fifth installation 510 comprises a fifth holding frame 512 for holding a fifth external rigid tube 516 and includes fifth first clamping means 517. A fifth chassis 520 comprises a fifth apron 522 shown in FIG. 7A in one of its two extreme positions and in FIG. 7B in the other of its two extreme positions. The fifth chassis 520 includes a fifth stop plate 524 and the fifth apron 522 is connected thereto by way of two fifth peripheral actuators 526, 528. The fifth apron 522 includes a fifth central passage 534 to enable the passage of a fifth internal rigid tube 542. On the other hand, fifth clamping means 538 are installed on the face of the fifth apron 522 around the fifth central passage 534 and in fixed manner relative to the apron 522.

Moreover, a longitudinal working space 584 extends between the fifth apron 522 and the fifth holding frame 512 and the fifth drum 536 is installed on a carriage 586 mobile in translation inside this longitudinal working space between the fifth apron 522 and the fifth holding frame 512, in a direction parallel to the axis of the fifth internal rigid tube 542. Also, in this fifth embodiment of the invention it is necessary for the apron 522 and the holding frame 512 to be installed at a distance from each other significantly greater than the distance between them in the aforementioned first embodiment.

The carriage 586 further includes attachment means 588 for connecting it in translation to the fifth internal rigid tube 542.

The carriage 586 is then mobile in translation between a position near the holding frame 512 as shown in FIG. 7A and a position far from the holding frame 512 but near the fifth apron 522, as shown in FIG. 7B.

The fifth drum 536 is then equipped with four fifth spools 568 of heating cables 569 diametrically opposite in pairs and arranged around the fifth internal rigid tube 542. Only two of these fifth spools 568 are shown here. The fifth drum 536 is also driven in rotation by a fifth electric motor 537 coupled to an adjustable variable speed drive.

Thus in this fifth embodiment of the invention lengthwise heating cable portions 569 are applied along the fifth internal rigid tube 542, independently of the fifth apron 522, by way of the carriage 586 when the latter is driven in reverse from the position near the holding frame 512 as shown in FIG. 7A toward the position far from the holding frame 512 as shown in FIG. 7B.

While the heating cables 569 are deployed around the internal rigid tube 542, or after that, the apron 522 is driven in rotation toward the stop plate 524. Furthermore, after the heating cables 569 have been deployed, the corresponding internal rigid tube 542 portion is equipped with insulation 582 and spacers 580.

The fifth second clamping means 538 of the retracted fifth apron 522 and the attachment means 588 of the carriage 586 are then activated. The fifth peripheral actuators 526, 528 are then actuated to drive in translation the fifth apron 512 and consequently the internal rigid tube 542 equipped with the heating cables 569 and the carriage 586 that is fastened to it. The internal rigid tube 542 equipped with the heating cables 569 is then forced into the interior of the external rigid tube 516, while the carriage 586 returns to its position near the holding frame 512 as shown in FIG. 7A.

The invention claimed is:

1. A method of manufacturing a rigid tubular pipe having a double casing for transporting hydrocarbons, the method comprising:
providing an internal rigid tube and an external rigid tube wherein the internal tube is to be engaged in the external tube;
providing a holding frame for holding an inlet end of the external rigid tube;
providing an apron equipped with an activatable grasping device for grasping the rigid internal tube, wherein the apron is mobile in translation between a position near the holding frame and a position far from the holding frame;
the method further comprising activating the grasping device and driving the apron toward the near position to engage the internal rigid tube in the interior of the external rigid tube and also leaving an annular space between the rigid tubes;
then deactivating the grasping device to release the internal rigid tube while driving the apron in reverse toward the far position;
providing heating cables for defining a lengthwise heating cable portion and applying the cable portion along the internal rigid tube when the apron is being driven in movement; and
driving of the apron toward the near position, while the lengthwise heating cable portion that is applied along the internal rigid tube is engaged in the interior of the annular space.

2. The method claimed in claim 1, further comprising the applying of the lengthwise heating cable portion is in a spiral around the internal rigid tube.

3. The method claimed in claim 1, further comprising simultaneously applying a plurality of the lengthwise heating cable portions.

4. The method claimed in claim 1, further comprising bending and storing the heating cables before applying the cables, and then deploying the stored lengthwise heating cable portion to apply the deployed lengthwise portion of the heating cables along the internal rigid tube.

5. The method claimed in claim 4, further comprising driving the bent heating cables in rotation about the internal rigid tube enabling application of the lengthwise heating cable portion in a spiral.

6. The method claimed in claim 1, further comprising applying the lengthwise heating cable portion along the internal rigid tube when the apron is driven in movement toward the near position.

7. The method claimed in any one of claim 1, further comprising applying the lengthwise heating cable portion along the internal rigid tube when the apron is driven in reverse toward the far position.

8. The method claimed in claim 4, further comprising storing the bent heating cables on the mobile apron.

9. The method claimed in claim 1, further comprising radially claimping the internal rigid tube to grasp the internal rigid tube.

* * * * *